United States Patent [19]
Fieler et al.

[11] Patent Number: 5,366,016
[45] Date of Patent: Nov. 22, 1994

[54] USE OF VARIABLE DENSITY CARRIER FLUIDS TO IMPROVE THE EFFICIENCY OF SCALE DISSOLUTION

[75] Inventors: Eleanor R. Fieler, Dallas; Alfred R. Jennings, Jr., Plano; James M. Paul, DeSoto, all of Tex.

[73] Assignee: Mobil Oil Corporation, Fairfax, Va.

[21] Appl. No.: 164,861

[22] Filed: Dec. 10, 1993

[51] Int. Cl.$^5$ .................... E21B 37/00; E21B 43/28
[52] U.S. Cl. ............................ 166/312; 166/305.1
[58] Field of Search .............. 166/269, 305.1, 312, 166/313

[56] References Cited

U.S. PATENT DOCUMENTS

| | | | |
|---|---|---|---|
| 4,030,548 | 6/1977 | Richardson et al. | 166/312 X |
| 4,387,770 | 6/1983 | Hill | 166/305.1 |
| 4,883,124 | 11/1989 | Jennings, Jr. | 166/307 |
| 4,947,933 | 8/1990 | Jones et al. | 166/263 |
| 5,084,105 | 1/1992 | Morris et al. | 166/312 X |
| 5,093,020 | 3/1992 | Paul et al. | 252/82 |
| 5,111,887 | 5/1992 | Morris et al. | 166/312 |
| 5,310,003 | 5/1994 | Jennings | 166/307 |

Primary Examiner—George A. Suchfield
Attorney, Agent, or Firm—Alexander J. McKillop; George W. Hager, Jr.; Charles A. Malone

[57] ABSTRACT

A method to improve the efficiency of scale dissolution in a formation containing multiple productive intervals where variable density liquids are utilized. Initially, a liquid composition sufficient to solubilize an alkaline-earth metal sulfate scale deposit is directed into a wellbore thereby contacting scale in one productive interval of the formation. Thereafter, a second scale solubilizing liquid having a density of about 0.1 wt % less than the first liquid is directed into the wellbore thereby contacting additional perforations and a higher interval. These scale solubilizing liquids with varying densities are allowed to remain in contact with perforations and productive intervals communicating therewith for a time sufficient to solubilize the scale deposit thereby efficiently removing said scale deposit from perforations and productive intervals at two different levels.

11 Claims, 1 Drawing Sheet

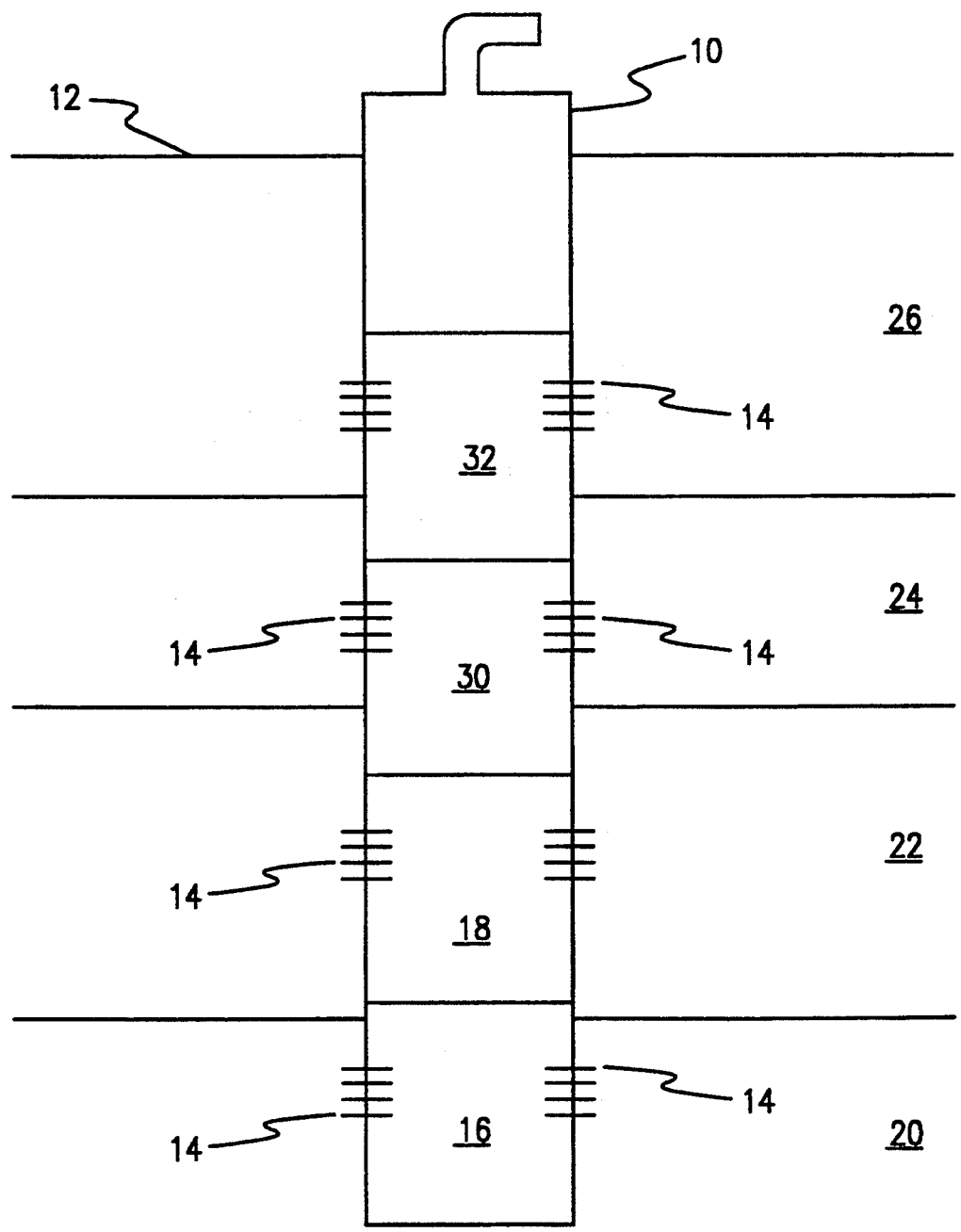

USE OF VARIABLE DENSITY CARRIER FLUIDS TO IMPROVE THE EFFICIENCY OF SCALE DISSOLUTION

FIELD OF THE INVENTION

This invention is directed to a method for the effective placement of compositions which are useful in solubilizing barium sulfate scale from wellbore surfaces containing said scale that communicate with a productive interval of a reservoir or formation.

BACKGROUND OF THE INVENTION

Most water contains alkaline-earth metal cations, such as barium, strontium, calcium and magnesium, and anions, such as sulfate, bicarbonate, carbonate, oxalate, phosphate, silicate and fluoride. When combinations of these anions and cations are present in concentrations which exceed the solubility of their reaction products, precipitates form until their product solubility concentrations are no longer exceeded. For example, when the barium ion and sulfate ion exceed the solubility of the barium sulfate reaction product, a solid phase of barium sulfate will form as a precipitate.

Solubility product concentrations are exceeded for various reasons, such as evaporation of the water phase, change in pH, pressure or temperature and the introduction of additional ions which can form insoluble compounds with the ions already present in the solution.

As these reaction products precipitate on the surfaces of the water-carrying or water-containing system, they form adherent deposits or scale. The scale prevents effective heat transfer, interferes with fluid flow, facilitates corrosive processes, and harbors bacteria. Scale is an expensive problem in many industrial water systems, in production systems for oil and gas, in pulp and paper mill systems, and in other systems, causing delays and shutdowns for cleaning and removal.

Once through and recirculating, cooling water systems are subject to the formation of scale deposits. Waterside problems encountered in boilers and steam systems include the formation of scale and other deposits, corrosion and foam. Scale and other deposits on heat-transfer surfaces can cause loss of the thermal efficiency of the boiler and can make the temperature of the boiler metal increase. Under scaling conditions, temperatures may go high enough to lead to failure of the metal due to overheating.

Barium and strontium sulfate scale deposits present a unique and sometimes "unsolvable" problem. Under most conditions, these sulfates are considerably less soluble in all solvents than any of the other commonly encountered scale-forming compounds. It is generally acknowledged that barium sulfate scale is almost impossible to remove by chemical means. Consequently, barium sulfate must be removed mechanically or the equipment, pipes, etc., containing the deposit must be discarded.

The incidence of barium sulfate scale is worldwide, and it occurs principally in systems handling subsurface waters. The barium sulfate scale problem is of particular concern to the petroleum industry since increasing volumes of water are produced with petroleum and more petroleum is produced by the water-flooding method of secondary recovery. The scale may occur in many different places, including production tubing, wellbore perforations, the area near the wellbore, gathering lines, meters, valves and in other production equipment.

Deposition of scale in production facilities and formation channels is a well-known source of problems in oil recovery. Barium sulfate scale is particularly troublesome when sulphate-rich seawater is used as an injection fluid in oil wells whose formation water is rich in barium ions. This scale causes severe problems in U.S. oil fields and older North Sea oil fields. Scaling of this nature is expected to occur during advanced production stages in other North Sea fields particularly after seawater breakthrough has taken place.

Barium sulfate scale may also form within subterranean formations such as in disposal wells. Scales and deposits can be formed to such an extent that the permeability of the formation is impaired resulting in lower flow rates, higher pump pressures, and ultimately abandonment of the well.

U.S. Pat. No. 5,093,020 which issued to Paul et al. teaches a method and composition for removing an alkaline earth metal sulfate scale deposits from wellbores and equipment used in the production of hydrocarbonaceous fluids from a reservoir or formation. The composition comprises an aqueous solution having a pH of about 8 to about 14, an EDTA or DTPA chelant, and a catalyst or synergist. Preferred chelants comprise diethylenetriaminepentaacetic acid (DTPA) or ethylenediaminetetraacetic acid (EDTA) or alkali salts thereof.

Although this method is effective in removing alkaline earth metal sulfate scale deposits from wellbores, precise placement of the composition into a desired interval of the wellbore could be improved. This is particularly true when diversion of this high density composition over an extensive interval is required in a hydrocarbonaceous fluid producing formation. If several feet of wellbore have been perforated for production, and if the perforated interval contains sections of high permeability (greater than 10 to 20 md), it may be difficult to effectively treat the entire zone with this high density composition at low surface injection rates, i.e. about 1 to about 2 BPM.

Therefore, what is needed is a method that would permit distribution of a high density alkaline earth metal sulfate scale solubilizing composition over an extended perforated productive interval of a formation or reservoir.

SUMMARY OF THE INVENTION

This invention is directed to a method to improve the efficiency of scale dissolution in multiple productive intervals of the formation or reservoir where variable density carrier fluids are utilized. In the practice of this invention, a liquid composition sufficient to solubilize an alkaline-earth metal sulfate scale deposit is directed into a wellbore so as to enter a perforated productive interval so as to communicate with said interval. Thereafter, a second alkaline-earth metal sulfate scale solubilizing liquid having a density lower than the first liquid composition is directed into the wellbore's higher perforated interval thereby placing it on top of the first liquid composition.

If needed, a third liquid composition sufficient to solubilize an alkaline-earth metal sulfate scale deposit is placed in the wellbore on top of the second liquid thereby entering a higher perforated productive interval of said wellbore that communicates fluidly with a third productive interval. This third liquid composition has a density that is less than the first and second liquid compositions that were directed into the wellbore. Therefore, the first liquid composition removes scale deposits from the perforated lower productive interval while the second liquid composition removes scale deposits from a perforated higher productive interval as the third liquid composition effectively removes scale from the third productive interval. Thus, alkaline-earth metal sulfate scale is removed from all intervals more efficiently than heretofore possible.

The liquid compositions comprise an aqueous solution having a pH of about 8 to 14, and EDTA or DTPA chelant, and a catalyst or synergist. Preferred chelants comprise diethylenetriaminepentaacetic acid (DTPA) and ethylenediaminetetraacetic acid (EDTA) or salts and mixtures thereof. Anions of organic or inorganic acids comprise the catalysts. Preferred catalysts include fluoride, oxalate, persulfate, dithionate, hypochlorite and formate anions.

The density of alkaline-earth metal sulfate scale solubilizing liquids used herein is decreased by utilizing a lower density liquid having a pH of at least about 12 that is mixed to obtain solubilizing liquids of a desired density. By decreasing steadily the density of the liquid compositions to solubilize the sulfate scale deposits, various portions of the perforated intervals can be treated to an extent previously unattainable by other methods.

Therefore it is an object of this invention to treat an extensive perforated interval of a wellbore communicating with multiple productive intervals so as to remove alkaline-earth metal sulfate scale and particularly barium sulfate scale therefrom.

It is another object of this invention to use alkaline-earth sulfate scale solubilizing liquids of different densities to solubilize barium sulfate scale so as to allow the liquids to enter into perforated multiple productive intervals at a slower and prolonged rate.

It is a further object of this invention to provide for a method of treating an extensive interval of a formation or reservoir so as to remove barium sulfate scale deposits at a substantially reduced cost.

It is a yet further object of this invention to provide a method which will remove substantially higher levels of dissolved barium, strontium, calcium, and other alkaline earth-metal sulfate scale from an extended productive interval of a formation than heretofore possible.

BRIEF DESCRIPTION OF THE DRAWINGS

The drawing is a schematic representation of a wellbore containing first and second scale solubilizing liquid compositions of varying densities.

DESCRIPTION OF THE PREFERRED EMBODIMENTS

In the practice of this invention, referring to the drawing, a first alkaline-earth sulfate scale solubilizing liquid composition is directed into wellbore 10 which penetrates formation 12. The wellbore has perforations 14 therein at different levels or intervals of a formation or reservoir. Perforations 14 fluidly communicate with different productive levels or intervals of the formation. The first scale solubilizing liquid composition which enters the formation is of a density higher than any of the compositions which will be subsequently injected into the formation. This highest density liquid which is first injected into wellbore 10 contains a composition which is sufficient to solubilize an alkaline-earth metal sulfate scale deposit from perforations in the wellbore and productive intervals communicating therewith.

Once the first highest density liquid has been placed in the wellbore, a second liquid containing a scale solubilizing composition similar to the first liquid that enables the dissolution of an alkaline-earth metal sulfate scale deposit from perforations in the wellbore and productive intervals communicating therewith is next injected into the wellbore. The second liquid has a density lower than the first liquid that was injected into the wellbore. The density of the second liquid will be at least 0.1 wt % less than the liquid which was first injected into the wellbore. Because the second liquid has a density less than that of the first liquid which was injected into the wellbore, it will remain above the first liquid.

As is shown in the drawing, the first liquid remains in wellbore 10 at level 16 so as to fluidly communicate with lower productive interval 20 via perforations 14. The second liquid is placed above level 16 into level 18 so as to fluidly communicate with productive interval 22 by perforations 14. Subsequently, a third liquid having a density less than the second liquid is placed above level 18 into level 30 so as to communicate fluidly with productive interval 24 by perforations 14. The last liquid which is injected into formation 12 by wellbore 10 is placed above level 30 into level 32 so as to fluidly communicate with upper productive interval 26 by perforations 14. All of the liquids which are injected at the different levels are comprised of a composition which is sufficient to solubilize an alkaline earth metal sulfate deposit from perforations in said wellbore and a productive interval communicating therewith. Once placed in the formation, these liquids at the different levels are allowed to remain in the wellbore so as to contact the perforations and intervals communicating therewith which contain the sulfate scale deposit for a time sufficient to solubilize said scale deposits therefrom.

The composition comprises an aqueous solution having a pH of from 8 to about 14.

Into this solution is placed about 0.1 to about 1.0M of ethylenediaminetetraacetic acid (EDTA) or diethylenetriaminepentaacetic acid (DTPA), or salts and mixtures thereof, which serves as a chelant. Thereafter, a catalyst is added to the aqueous solution in a concentration of about 0.01 to about 0.5M. The catalyst is selected from a member of the group consisting of oxalate, salicylate, fluoride, persulfate dithionate, hypochlorite, formate, thio, amino, or hydroxy acetate anions. The aqueous composition is used to remove scale from equipment utilized in the production of oil and/or water from an underground formation. Said composition can be utilized to resolve scaling conditions and problems mentioned above.

The aqueous liquid containing the composition is directed down the wellbore to remove barium sulfate scale which has fouled the tubular equipment and passage ways. Prior to being directed into the wellbore, the composition may be heated to a temperature between about 25° C. to about 100° C. Once within the tubular goods and the passage ways requiring treatment, the composition is allowed to remain there for about 10 minutes to about 7 hours. After remaining in contact with the equipment for the desired time, the composition containing the dissolved scale is produced to the surface. This procedure can be repeated as often as required to remove scale from the equipment.

U.S. Pat. No. 5,093,020 which issued to Paul et al. on Mar. 3, 1992 discloses similar compositions as utilized above for removing barium and strontium sulfate scale deposits. This patent is hereby incorporated by reference herein.

In order to obtain a desired density of the compositions used to solubilize the alkaline earth metal sulfate scales herein, salts of alkali or alkaline-earth metals in aqueous solutions and mixtures thereof may be utilized. The preferred salt solution is sodium chloride because of its ready availability. Zinc chloride solutions may be also be used. Although sodium chloride, potassium chloride, calcium chloride, and zinc chloride may be used, bromides of these salts may also be utilized. These salt solutions utilized herein contain a high pH buffering system with a means to obtain a stable pH of about 8 to about 14, preferably about 12. Although an aqueous salt solution is preferred, hydrocarbons can also be utilized to obtain a desired fluid density in combination with the higher density liquid composition used for solubilizing the alkaline earth metal sulfate scale deposits. The preferred pH of the liquids used to solubilize the sulfate scale deposits is about 12.

The density of the scale solubilizing composition will be about 12 pounds per gallon. Maintenance of the pH is critical and the density of the liquid in its present form relates to the additive required to maintain the pH. As previously mentioned, the heavier scale solubilizing liquid should be at the bottom of the wellbore with scale solubilizing liquids of a lower density over a higher density solubilizing fluid. The density difference should vary and be about 0.1 wt % difference. By placement of the scale solubilizing liquids of lowering densities proceeding up the wellbore, it is possible to effectively treat an entire zone of a formation containing multiple productive intervals with sections of high permeability i.e. greater than 10 to about 20 md. Because the density is lowered as the liquids proceed up the wellbore, an entire multiple level productive zone can be effectively treated at the low injection rate of about 1 to about 2 BPM.

By utilizing this method with the variable density liquids as disclosed, the scale solubilizing liquid can be distributed over an extended perforated interval. A preferred method to be used involves the utilization of two storage tanks at the surface. The scale solubilizing liquid with the highest density is placed in one tank. A second tank which contains a lower density liquid, preferably a saline one, having either a water or hydrocarbon base, is used to obtain a desired density variation. This is accomplished by pumping the salt containing solution along with the sulfate scale solubilizing solution at a desired rate to obtain a density difference of about 0.1 wt %. Following a pre-determined volume of the higher density sulfate scale solubilizing solution, fractions of the lower density salt containing liquid is added to a flow stream directed into the wellbore thereby diluting the concentrated scale solubilizing composition to a lower desired density. A steadily decreasing liquid density allows various portions of the perforated interval to be treated. Salts which are utilized herein are disclosed in U.S. Pat. No. 4,883,124 that issued at A. R. Jennings, Jr. on Nov. 28, 1989. This patent is hereby incorporated by reference herein.

The density of the scale solubilizing liquid that is used in a first stage or level is from about 11.5 to about 12.0 pounds per gallon. The density of the scale solubilizing solution that will be used in a second stage or level in the wellbore is from about 10.5 to about 11.0 pounds per gallon. When a third stage or level of the scale solubilizing solution is utilized, this density should be about 9.5 to about 10.5 pounds per gallon. When an extensive perforated interval is encountered as described in the drawing, a fourth stage scale solubilizing liquid should have a density of from about 8.5 to about 9.5 pounds per gallon.

In addition to directing or pumping the scale solubilizing liquids into the wellbore, these liquids can be flowed into the wellbore by a concentric tubing arrangement as is disclosed in U.S. Pat. No. 4,947,933 which is hereby incorporated by reference herein. The aqueous medium which is utilized herein can comprise fresh water, brackish water, or seawater, and mixtures thereof. Hydrocarbons which can be utilized herein include fuel oil, kerosene, and mixtures thereof.

After the scale solubilizing liquids of varying densities have remained in the wellbore for a time sufficient to solubilize the alkaline-earth metal sulfate scale deposits from perforations and intervals of a formation communicating therewith, the high density scale solubilizing liquid is directed into the wellbore to flush the wellbore out. Afterwards, scale solubilizing liquids with decreasing densities can be flowed into the wellbore to flush out any remaining liquid until a desired lower density of the scale solubilizing liquid remains in the wellbore. Afterwards, a salt solution can be used to flush the scale solubilizing liquid out of the wellbore or it can be circulated out. Thus, the wellbore and perforations will be cleared of the scale solubilizing liquid to a concentration desired. Later, the well can be placed back on production. Subsequently, an enhanced oil recovery (EOR) method can be commenced into the multiple productive intervals so as to remove hydrocarbonaceous from said intervals.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed:

1. A method to improve the efficiency of scale dissolution in a formation containing multiple productive intervals where variable density carrier liquids are utilized comprising:
    a) directing into a perforated wellbore a liquid composition sufficient to solubilize an alkaline-earth metal sulfate scale deposit from perforations and productive intervals communicating therewith with which composition is of a known density; and
    b) directing into said wellbore on top of said first liquid a second liquid composition sufficient to solubilize an alkaline-earth metal sulfate scale in a higher perforated interval of said wellbore which communicates fluidly with said productive intervals where said second liquid has a density less than that of the first liquid thereby efficiently removing said scale deposit from said perforations and productive intervals.

2. The method as recited in claim 1 where in step b) the density of the second liquid is decreased by adding a lower density salt solution of an alkali or alkaline-earth metal therein.

3. The method as recited in claim 1 where in step b) the density of the second liquid is decreased by adding an aqueous or hydrocarbonaceous solution containing a salt of an alkali or alkaline-earth metal therein in an amount sufficient to obtain a density of at least 0.1 wt % less than the density of the first liquid.

4. The method as recited in claim 1 where in step b), the density of the second liquid is decreased by adding an aqueous or hydrocarbonaceous solution of an alkali or alkaline-earth metal therein containing bromides or chlorides in an amount sufficient to obtain a density of at least 0.1 wt. % less than that of the first liquid.

5. The method as recited in claim 1 where liquids with decreasing density of at least 0.1 wt % are added above the first and second liquids until all of the desired productive intervals and perforations communicating therewith have been treated with the scale solubilizing solution.

6. The method as recited in claim 1 where the aqueous salt solution is selected from a member of the group consisting of sodium chloride, potassium chloride, zinc chloride, sodium bromide, potassium bromide, or zinc bromide.

7. The method as recited in claim 1 where the density of the first scale solubilizing liquid is from about 11.5 to about 12.0 pounds per gallon.

8. The method as recited in claim 1 where the density of the second scale solubilizing liquid is from about 10.5 to about 11.0 pounds per gallon.

9. The method as recited in claim 1 where after step b) a third stage scale solubilizing liquid is directed into the wellbore which liquid has a density of about 9.5 to about 10.0 pounds per gallon.

10. The method as recited in claim 1 where after step b) third and fourth scale solubilizing liquids are directed into the wellbore which third stage liquid solution has a density less than the second stage liquid and the forth stage liquid has a density of about 8.5 to about 9.0 pounds per gallon.

11. The method as recited in claim 1 where the alkaline-earth sulfate scale solubilizing liquids in steps a) and b) comprise;
 a) an aqueous solution consisting essentially of a pH of about 8 to about 14 which solution contains,
  i) an aminocarboxylic acid or a polyamine chelant, salts and mixtures thereof in an amount of at least from about 0.1 to about 1.0M, and
  ii) a catalyst in an amount of at least from about 0.01 to about 0.5M which catalyst is a member selected from the group consisting of fluoride, oxalate, persulfate, dithionate, hypochlorite, formate, thio, amino, and hydroxy acetate anions thereby making a solution which can dissolve substantially more scale within a substantially reduced time than is possible with said chelant alone.

* * * * *